United States Patent
Weng et al.

(10) Patent No.: US 12,546,500 B2
(45) Date of Patent: Feb. 10, 2026

(54) AIR CONDITIONER AND METHOD FOR CONTROLLING AIR CONDITIONER AND COMPUTER READABLE STORAGE MEDIUM

(71) Applicants: GUANGZHOU HUALING REFRIGERATION EQUIPMENT CO., LTD., Guangzhou (CN); GD MIDEA AIR-CONDITIONING EQUIPMENT CO., LTD., Foshan (CN)

(72) Inventors: Jinlian Weng, Guangzhou (CN); Chengwu Zheng, Guangzhou (CN)

(73) Assignees: GUANGZHOU HUALING REFRIGERATION EQUIPMENT CO., LTD., Guangzhou (CN); GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 471 days.

(21) Appl. No.: 18/016,263

(22) PCT Filed: Nov. 17, 2020

(86) PCT No.: PCT/CN2020/129251
§ 371 (c)(1),
(2) Date: Jan. 13, 2023

(87) PCT Pub. No.: WO2022/057068
PCT Pub. Date: Mar. 24, 2022

(65) Prior Publication Data
US 2023/0314034 A1  Oct. 5, 2023

(30) Foreign Application Priority Data
Sep. 21, 2020 (CN) .......................... 202010998098.X (51) Int. Cl.
*F24F 11/64* (2018.01)
*F24F 11/65* (2018.01)
(Continued)

(52) U.S. Cl.
CPC .............. *F24F 11/64* (2018.01); *F24F 11/65* (2018.01); *F24F 11/77* (2018.01); *F24F 11/79* (2018.01);
(Continued)

(58) Field of Classification Search
CPC .. F24F 11/56; F24F 11/64; F24F 11/65; F24F 11/77; F24F 11/79; F24F 2110/10;
(Continued)

(56) References Cited

U.S. PATENT DOCUMENTS

2009/0210193 A1* 8/2009 Nagase .................. F24F 11/30
250/208.2
2013/0197699 A1* 8/2013 Gyota .................... F24F 11/523
700/276
(Continued)

FOREIGN PATENT DOCUMENTS

CN  101769574 A  7/2010
CN  104279700 A  1/2015
(Continued)

OTHER PUBLICATIONS

World Intellectual Property Organization (WIPO) International Search Report and Written opinion for PCT/CN2020/129251 Jun. 7, 2021 14 Pages (Translation Included).
(Continued)

*Primary Examiner* — Tameem D Siddiquee
(74) *Attorney, Agent, or Firm* — Anova Law Group, PLLC (57) ABSTRACT

A method for controlling an air conditioner includes receiving, by the air conditioner, first position information sent by
(Continued)

a terminal and updating position information of the air conditioner from second position information to the first position information. The first position information is obtained by a positioning module of the terminal positioning the air conditioner.

15 Claims, 3 Drawing Sheets

(51) Int. Cl.
  *F24F 11/77* (2018.01)
  *F24F 11/79* (2018.01)
  *F24F 110/10* (2018.01)
  *F24F 110/20* (2018.01)
  *F24F 110/50* (2018.01)

(52) U.S. Cl.
  CPC ....... *F24F 2110/10* (2018.01); *F24F 2110/20* (2018.01); *F24F 2110/50* (2018.01)

(58) Field of Classification Search
  CPC ............... F24F 2110/20; F24F 2110/50; F24F 2130/00; Y02B 30/70
  See application file for complete search history.

(56) References Cited

U.S. PATENT DOCUMENTS

| | | | | |
|---|---|---|---|---|
| 2015/0338117 | A1* | 11/2015 | Henneberger | G05B 15/02 700/276 |
| 2016/0146480 | A1* | 5/2016 | Ito | F24F 11/30 62/93 |
| 2020/0217540 | A1* | 7/2020 | Fan | F24F 11/30 |
| 2022/0349607 | A1* | 11/2022 | Umado | F24F 11/0008 |

FOREIGN PATENT DOCUMENTS

| | | |
|---|---|---|
| CN | 104279725 A | 1/2015 |
| CN | 104776560 A | 7/2015 |
| CN | 105020860 A | 11/2015 |
| CN | 105162821 A | 12/2015 |
| CN | 105823167 A | 8/2016 |
| CN | 106679112 A | 5/2017 |
| CN | 108151243 A | 6/2018 |
| CN | 108444075 A | 8/2018 |
| CN | 109237749 A | 1/2019 |
| CN | 109595759 A | 4/2019 |
| CN | 109682023 A | 4/2019 |
| CN | 109922154 A | 6/2019 |
| CN | 109974224 A | 7/2019 |
| CN | 110542179 A | 12/2019 |
| CN | 110553361 A | 12/2019 |
| CN | 110608517 A | 12/2019 |
| CN | 110895012 A | 3/2020 |
| CN | 110986329 A | 4/2020 |
| CN | 111006374 A | 4/2020 |
| CN | 111094863 A | 5/2020 |
| JP | 2005016885 A | 1/2005 |
| JP | 2007093138 A | 4/2007 |
| JP | 2012122723 A | 6/2012 |
| WO | 2020107141 A1 | 6/2020 |

OTHER PUBLICATIONS

The China National Intellectual Property Administration (CNIPA) The First Office Action for Chinese Application 202010998098.X Aug. 16, 2022 12 Pages (With Translation).
The China National Intellectual Property Administration (CNIPA) The Notification to Grant Patent Right for Invention 202010998098.X Oct. 31, 2022 7 Pages (With Translation).
The European Patent Office (EPO) Communication pursuant to Rules 70(2) and 70a(2) EPC for Application No. 20953925.3 Feb. 9, 2024 10 Pages.

* cited by examiner

AIR CONDITIONER AND METHOD FOR CONTROLLING AIR CONDITIONER AND COMPUTER READABLE STORAGE MEDIUM

CROSS-REFERENCE TO RELATED APPLICATIONS

The present application is a National Stage Entry under 35 U.S.C. § 371 of International Application No. PCT/CN2020/129251, filed on Nov. 17, 2020, which claims priority to Chinese Patent Application No. 202010998098.X, entitled "AIR CONDITIONER AND METHOD FOR CONTROLLING AIR CONDITIONER AND COMPUTER READABLE STORAGE MEDIUM," and filed on Sep. 21, 2020, the entire contents of both of which are incorporated herein by reference.

The present application claims priority to Chinese Patent Application No. 202010998098.X, entitled "AIR CONDITIONER AND METHOD FOR CONTROLLING AIR CONDITIONER AND COMPUTER READABLE STORAGE MEDIUM," and filed on Sep. 21, 2020, the entire contents of which are incorporated herein by reference.

TECHNICAL FIELD

The present application relates to the technical field of air conditioners, and in particular to an air conditioner, a method for controlling an air conditioner and a computer readable storage medium

BACKGROUND

In the field of air conditioners, the parameters of an air conditioner need to be adapted according to its position, so that the operation of the air conditioner meets the requirements for the users in the area where the air conditioner is located, i.e., the operating parameters adapted to the air conditioner are related to the position of the air conditioner.

Currently, the position of an air conditioner is determined by a network module obtaining the home network IP address information. When the home network IP address is dynamically assigned, the position of the air conditioner differs significantly from the actual position, and the position of the air conditioner is not accurate.

SUMMARY

The main purpose of the present application is to provide an air conditioner and a method for controlling an air conditioner and a computer readable storage medium, aiming to solve the problem of inaccurate position of the air conditioner.

In order to achieve the above purpose, the present application provides a method for controlling an air conditioner, including:

receiving, by the air conditioner, first position information sent by a terminal, wherein the first position information is obtained by a positioning module of the terminal positioning the air conditioner; and updating second position information of the air conditioner to the first position information.

In an embodiment, after the operation of updating the second position information of the air conditioner to the first position information, the method further includes:

updating set operating parameters of the air conditioner according to the first position information.

In an embodiment, before the operation of receiving, by the air conditioner, the first position information sent by the terminal, the method further includes:

after the air conditioner starts to operate, determining an operating mode of the air conditioner;

in response to determining that the set operating parameters corresponding to the operating mode are related to a position of the air conditioner, obtaining the second position information stored in the air conditioner, and sending the second position information to the terminal;

after receiving the second position information, the terminal obtains the first position information via the positioning module positioning the air conditioner, and sends the first position information to the air conditioner in response to that the first position information does not match the second position information; and the operation of updating set operating parameters of the air conditioner according to the first position information includes:

updating the set operating parameters of the operating mode according to the first position information.

In an embodiment, the set operating parameters include at least one of: set cooling temperature, set heating temperature, set humidity, set cleanliness, set freshness, set air speed, and set sweeping direction of an air deflector.

In an embodiment, after the operation of receiving, by the air conditioner, the first position information sent by the terminal, the method further includes:

obtaining a product serial number of the air conditioner;
determining recommended position information corresponding to the product serial number; and
in response to that the recommendation position information matches the first position information, executing the operation of updating the second position information of the air conditioner to the first position information.

In an embodiment, after the operation of updating the second position information of the air conditioner to the first position information, the method further includes:

determining a first annual performance factor of the air conditioner corresponding to a first area and a second annual performance factor of the air conditioner corresponding to a second area, wherein the first area is determined according to the first position information, and the second area is determined according to the second position information; and in response to that a difference between the first annual performance factor and the second annual performance factor is greater than a preset threshold, executing the operation of updating the second position information of the air conditioner to the first position information.

In an embodiment, after the operation of updating the second position information of the air conditioner to the first position information, the method further includes:

displaying prompt information of updating the second position information to the first position information.

In an embodiment, the air conditioner receives the first position information through a near-field communication module.

In order to achieve the above purpose, the present application also provides an air conditioner, including a memory, a processor, and a control program that is stored in the memory and operable on the processor, wherein the control program when executed by the processor implements the method for controlling the air conditioner as mentioned above.

In order to achieve the above purpose, the present application also provides a computer readable storage medium, characterized in that the computer readable storage medium stores a control program, wherein the control program when executed by the processor implements the method for controlling the air conditioner as mentioned above.

The present application provides an air conditioner and a method for controlling an air conditioner and a computer readable storage medium. The air conditioner receives the first position information sent by the terminal, the first position information is obtained by the positioning module of the terminal positioning the air conditioner. The air conditioner updates the position information to the first position information. Because the air conditioner updates the stored position information to the position information of the terminal positioning the air conditioner, it does not need to determine the position through the home IP address to avoid inaccuracy of the position stored in the air conditioner caused by the dynamic distribution of the home IP address, that is, the position stored in the air conditioner of the present application is accurate.

The realization of the purpose, functional features and advantages of the present application will be further explained with reference to the drawings in conjunction with the embodiments.

DETAILED DESCRIPTION OF THE EMBODIMENTS

It should be understood that the specific embodiments described here are only used to explain the present application, but not limit the present application.

The main solution of the embodiment of the present application is: receiving, by the air conditioner, first position information sent by a terminal, the first position information being obtained by a positioning module of the terminal positioning the air conditioner; and updating second position information of the air conditioner to the first position information.

Because the air conditioner updates the stored position information to the position information of the terminal positioning the air conditioner, it does not need to determine the position through the home IP address to avoid inaccuracy of the position stored in the air conditioner caused by the dynamic distribution of the home IP address, that is, the position stored in the air conditioner of the present application is accurate.

Figure 1:
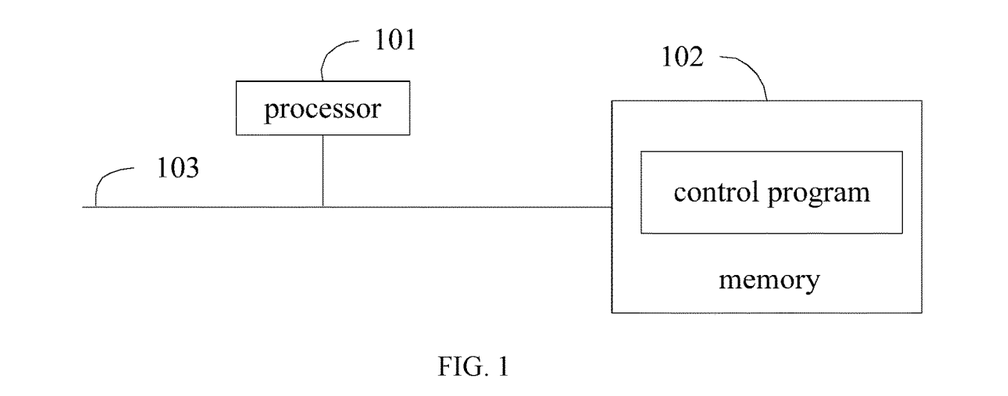
FIG. 1 is a schematic diagram of a hardware architecture of an air conditioner according to an embodiment of the present application.

As shown in FIG. 1, FIG. 1 is a schematic diagram of a hardware architecture of an air conditioner according to an embodiment of the present application.

The terminal in the embodiments of the present application can be an air conditioner. The air conditioner includes: a processor 101, such as a CPU, a memory 102, and a communication bus 103. The communication bus 103 is used to realize the communication among these components.

The memory 102 can be a high-speed RAM memory or a non-volatile memory, such as disk memory. As shown in FIG. 1, the memory [103] 102 as a computer storage medium can include a control program. The processor 101 can invoke the control program stored in the memory 102 and perform the following operations:

receiving, by the air conditioner, first position information sent by a terminal, wherein the first position information is obtained by a positioning module of the terminal positioning the air conditioner; and updating second position information of the air conditioner to the first position information.

In an embodiment, the processor 101 can invoke the control program stored in the memory 102 and perform the following operations:

updating set operating parameters of the air conditioner according to the first position information.

In an embodiment, the processor 101 can invoke the control program stored in the memory 102 and perform the following operations:

after the air conditioner starts to operate, determining an operating mode of the air conditioner;

in response to determining that the set operating parameters corresponding to the operating mode are related to a position of the air conditioner, obtaining the second position information stored in the air conditioner, and sending the second position information to the terminal;

after receiving the second position information, the terminal obtains the first position information via the positioning module positioning the air conditioner, and sends the first position information to the air conditioner in response to that the first position information does not match the second position information;

the operation of updating set operating parameters of the air conditioner according to the first position information includes:

updating the set operating parameters of the operating mode according to the first position information.

In an embodiment, the processor 101 can invoke the control program stored in the memory 102 and perform the following operations:

the set operating parameters include any one of: set cooling temperature, set heating temperature, set humidity, set cleanliness, set freshness, set air speed, and set sweeping direction of an air deflector.

In an embodiment, the processor 101 can invoke the control program stored in the memory 102 and perform the following operations:

obtaining a product serial number of the air conditioner;

determining recommended position information corresponding to the product serial number; and in response to that the recommendation position information matches the first position information, executing the operation of updating the second position information of the air conditioner to the first position information.

In an embodiment, the processor 101 can invoke the control program stored in the memory 102 and perform the following operations:

determining a first annual performance factor of the air conditioner corresponding to a first area and a second annual performance factor of the air conditioner corresponding to a second area, wherein the first area is determined according to the first position information, and the second area is determined according to the second position information; and in response to that a difference between the first annual performance factor and the second annual performance factor is greater than a preset threshold, executing the operation of updating the second position information of the air conditioner to the first position information.

In an embodiment, the processor 101 can invoke the control program stored in the memory 102 and perform the following operations:

displaying prompt information of updating the second position information to the first position information.

In an embodiment, the processor 101 can invoke the control program stored in the memory 102 and perform the following operations:

the air conditioner receives the first position information through a near-field communication module.

According to the above embodiments, the air conditioner receives the first position information sent by the terminal, the first position information is obtained by the positioning module of the terminal positioning the air conditioner. The air conditioner updates the position information to the first position information. Because the air conditioner updates the stored position information to the position information of the terminal positioning the air conditioner, it does not need to determine the position through the home IP address to avoid inaccuracy of the position stored in the air conditioner caused by the dynamic distribution of the home IP address, that is, the position stored in the air conditioner of the present application is accurate.

Based on the hardware structure of the above air conditioner, the embodiments of the method for controlling the air conditioner of the present application are proposed.

Figure 2:
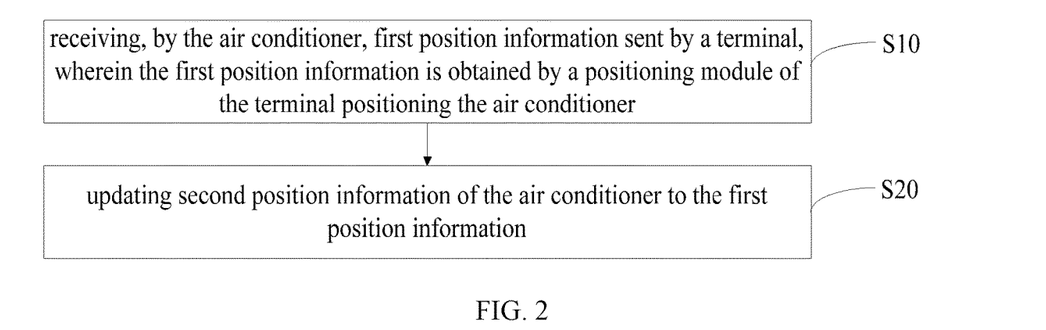
FIG. 2 is a flowchart of a method for controlling an air conditioner according to a first embodiment of the present application.

Referring to FIG. 2, FIG. 2 is a method for controlling an air conditioner according to a first embodiment of the present application. The method for controlling the air conditioner includes:

operation S10, receiving, by the air conditioner, first position information sent by a terminal, wherein the first position information is obtained by a positioning module of the terminal positioning the air conditioner.

In the embodiment, the air conditioner can be an Internet of Things (IoT) air conditioner, that is, the air conditioner is provided with an IoT communication module. The air conditioner is communicated with the terminal through the IoT communication module. The terminal is provided with an IoT control program, and the terminal can send information to the air conditioner through the IoT control program. The terminal can be a portable terminal, for example, a mobile phone, an iPad, or the terminal can be a fixed terminal in a home, and the fixed terminal can be a computer or a wire controller in a home.

The terminal can be the mobile phone of the air conditioner's installer. After installing the IoT air conditioner, the installer needs to activate the IoT air conditioner by using the IoT control program. Specifically, the installer positions a current position of the IoT air conditioner through the positioning module of the terminal loaded with the IoT APP to obtain the first position information, and the terminal sends the first position information to the air conditioner. The first position information may be a specific geographic position where the IoT air conditioner is located, for example, the IoT air conditioner is in the street C of the district B of city A. The first position information may also include latitude and longitude, that is, the first position information includes the longitude and latitude of the area where the IoT air conditioner is located, the air conditioner can determine the area where the IoT air conditioner is located by the longitude and latitude, without identifying the specific street of the area of the city for positioning, which facilitates positioning the air conditioner, and the air conditioner can be positioned accurately.

In addition, the air conditioner can send information to the terminal every time the air conditioner is turned on, so that the first position information is sent by the terminal to the air conditioner, to avoid inaccuracy of the position stored in the air conditioner caused by updating the home dynamic network.

The first position information can be sent to the air conditioner through a remote communication module. The remote communication module can be a WiFi module, 4G/5G communication module, i.e., the terminal sends the first position information to the air conditioner through the network. In addition, the air conditioner is provided with a near-field communication module, and the near-field communication module can be an infrared transmitting module, a Bluetooth module, etc. After obtaining the first position information, the terminal encodes the first position information into near-field communication data and sends the near-field communication data to the air conditioner in the near-field communication mode, and the air conditioner decodes the received near-field communication data to obtain the first position information, i.e., the terminal and the air conditioner carry out data transmission through the near-field communication data. The near-field communication method requires the terminal and the air conditioner to be in the same area, therefore, the terminal must be located near the air conditioner for positioning, so as to ensure that the first position information sent by the terminal is the actual position of the air conditioner, i.e., to avoid the air conditioner from receiving the first position information obtained by the terminal remotely positioning the air conditioner, and thus to avoid inaccuracy of the first position information received by the air conditioner.

Of course, the terminal can send the first position information to the air conditioner through the home network to ensure that the first position information is the actual position of the air conditioner. When receiving the first position information, the air conditioner determines the communication address of the terminal, and if the communication address is the communication address of the home network, the air conditioner can determine that the terminal and the air conditioner are located in the same area, and the air conditioner updates the second position information to the first position information; if the communication address is not the communication address of the home network, the air conditioner discards the first position information. Further, if the communication address is not the communication address of the home network, but the air conditioner receives the first position information through the near-field communication module, that is, it can be determined that the terminal and the air conditioner are not located in the same area, and the air conditioner updates the second position information to the first position information. In this way, it can avoid recording the position of the user to the position of the air conditioner itself when the user remotely logs into the APP.

Operation S20, updating second position information of the air conditioner to the first position information.

After obtaining the first position information, the air conditioner will write the first position information into the storage area, and the data in the storage area is covered, that is, the second position information of the air conditioner will be changed to the first position information. Further, the terminal will add verification information to the first position information when sending the first position information to the air conditioner. After receiving the first position information, the air conditioner will obtain the carried verification information, and compare the verification information with the preset verification information. If they are consistent, the verification is passed, and the air conditioner will update the second position information to the first position information.

In addition, a display screen is provided on the air conditioner. After the air conditioner updates the second position information to the first position information, the display screen can display the prompt information of "updating the second position information to the first position information." The position information and the first position information are both represented using specific areas. The installer or users can determine whether the position information updated by the air conditioner is accurate according to the displayed prompt information. If inaccurate, the terminal is controlled to position the position of the air conditioner again to obtain the first position information, and then send the first position information to the air conditioner, so that the air conditioner returns to execute operation S10 and the operation S20.

In addition, the terminal in the embodiment is a terminal with a preset authority. The terminal with the preset authority refers to the terminal bound to security staff with the authority to install the air conditioner, or the terminal with the preset authority refers to the terminal bound to the staff for post-sale maintenance of the air conditioner. In the server, a device identification of the terminal with the preset authority is stored. When the air conditioner obtains the device identification of the terminal after receiving the first position information sent by the terminal, and sends the device identification to the server for identifying the identification of the terminal. If the server stores the device identification sent by the air conditioner, it feeds back a prompt information that the terminal has the preset authority to the air conditioner, and the air conditioner can update the second position information to the first position information. If the server does not store the device identification sent by the air conditioner, the server feeds back the prompt information that the terminal has not the preset authority to the air conditioner, and the air conditioner discards the first position information.

In an embodiment, the terminal can be a mobile phone of the user in the home where the air conditioner is located. The air conditioner is provided with two-dimensional (QR) code of an updated position. The mobile phone of the user can scan the QR code to send the first position information to the server. The server obtains the device identification of the mobile phone. If the device identification is the device identification of the terminal bound to the air conditioner (the terminal bound to the air conditioner is a mobile phone for the user in the home), the server first stores the first position information. When the air conditioner requests the position information, the server sends the first position information to the air conditioner, so that the air conditioner will update the second position information to the first position information. It is understood that the air conditioner can also receive the first position information sent by the server, which is not only limited to receiving the first position information sent by the terminal.

In the technical scheme provided by the embodiment, the air conditioner receives the first position information sent by the terminal, the first position information is obtained by the positioning module of the terminal positioning the air conditioner. The air conditioner updates its position information to the first position information. Because the air conditioner updates the stored position information to the position information of the terminal positioning the air conditioner, it does not need to determine the position through the home IP address to avoid inaccuracy of the position stored in the air conditioner caused by the dynamic distribution of the home IP address, that is, the position stored in the air conditioner of the present application is accurate.

Figure 3:
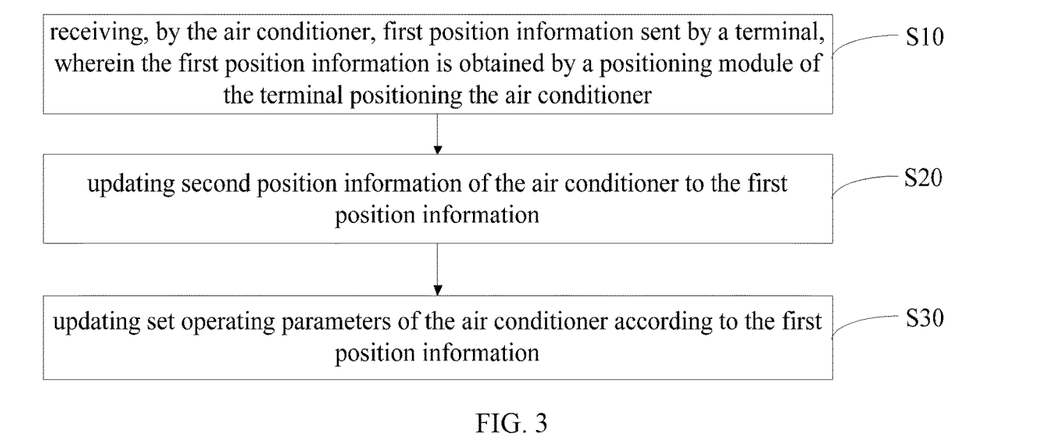
FIG. 3 is a flowchart of the method for controlling the air conditioner according to a second embodiment of the present application.

Referring to FIG. 3, FIG. 3 is the method for controlling the air conditioner according to the second embodiment of the present application. Based on the first embodiment, after the operation S20, the method further includes:

operation S30, updating set operating parameters of the air conditioner according to the first position information.

The energy consumption efficiency standard for inverter air conditioners is calculated in terms of the annual performance factor (APF). The APF is calculated by using a uniform set of operating time curves, and the calculation process does not take into account geographical differences. The APF calculation method stipulated in the national standard is adopted by means of theoretical selection and sampling survey, and the geographical differences in energy consumption efficiency of air conditioners are analyzed and counted with two time curves. The results show that there are significant geographical differences in the energy consumption efficiency of inverter air conditioners, for example, the results of the sampling time curves show that the APF difference between South China and Central China is large (nearly 1.86). Functional problems caused by geographical differences can also affect users' usage, for example, in areas with high average annual humidity, the settable humidity (or compensation) of inverter air conditioners should be higher to ensure that the air conditioner will not be shut down when the humidity is not reached.

In this regard, the corresponding set operating parameters are set for different areas of the air conditioner. After the air conditioner then changes the position information to the first position information, the air conditioner determines the area where the air conditioner is located according to the first position information, then the set operating parameters corresponding to the area are obtained, and then the set operating parameters of the air conditioner are changed based on the obtained operating parameters. In addition, the air conditioner may load the energy efficiency parameter table and the function parameter table of the area corresponding to the first position information, to conduct updating.

In an embodiment, it takes a long time for the air conditioner to change the set operating parameters and load the energy efficiency parameter table and the function parameter table. In this regard, the air conditioner obtains the first annual performance factor of the air conditioner corresponding to the first area and the second annual performance factor of the air conditioner corresponding to the second area, the first area corresponds to the first position information, and the second area corresponds to the second position information. The air conditioner then calculates the difference between the first annual performance factor and the second annual performance factor, and if the difference is small, it indicates that the difference between the set operating parameters of the air conditioner in the two areas is small and the air conditioner may not change the set operating parameters. If the difference is large, it indicates that the difference between the set operating parameters of the air conditioner in the two areas is large and the air conditioner needs to update the set operating parameters according to the first position parameters.

The set operating parameters can be the default operating parameters of the air conditioner, and the default operating parameters can be the operating parameters of the air conditioner for creating a comfortable environment, or can be the upper limit values and the lower limit values of the operating parameters of the air conditioner. The set operating parameters include at least one of: set cooling temperature, set heating temperature, set humidity, set cleanliness, set freshness, set air speed, and set sweeping direction of an air deflector. The cleanliness can be determined by the concentration of particles or harmful gases in the space where the air conditioner is located, the lower the concentration of particles, the higher the cleanliness; the higher the concentration of harmful gases, the lower the cleanliness. Freshness can be determined by the concentration of carbon dioxide or oxygen in the space where the air conditioner is located; the higher the concentration of carbon dioxide, the lower the freshness; the higher the concentration of oxygen, the higher the freshness. The following are some examples:

| Heating mode | City A | temperature | 23.5° C. |
| --- | --- | --- | --- |
| | | humidity | 57% |
| | | cleanliness | 5 |
| | | freshness | 700 |
| | | air speed | 59% |
| | | swing left and right | closed |
| | | swing up and down | closed |
| | City B | temperature | 23° C. |
| | | humidity | 62% |
| | | cleanliness | 36 |
| | | freshness | 700 |
| | | air speed | 66% |
| | | swing left and right | closed |
| | | swing up and down | closed |
| | City C | temperature | 24.5° C. |
| | | humidity | 64% |
| | | cleanliness | 63 |
| | | freshness | 700 |
| | | air speed | 70% |
| | | swing left and right | closed |
| | | swing up and down | closed |

In the technical solution provided by the embodiment, after updating the position information to the first position information, the air conditioner updates the set operating parameters of the air conditioner according to the first position information, so that the air conditioner can meet the user's needs when operating.

Figure 4:
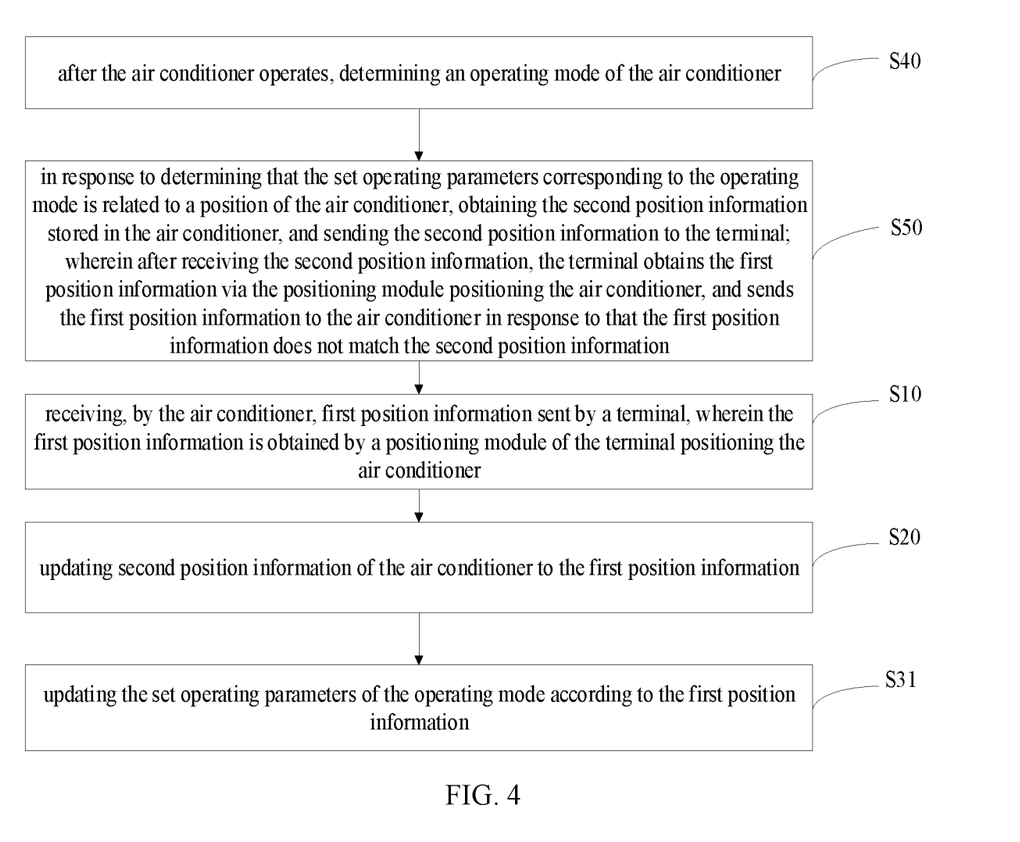
FIG. 4 is a flowchart of the method for controlling the air conditioner according to a third embodiment of the present application.

Referring to FIG. 4, FIG. 4 is the method for controlling the air conditioner according to the third embodiment of present application. Based on the first or second embodiment, before the operation S10, the method further includes:

operation S40, after the air conditioner starts to operate, determining an operating mode of the air conditioner;

operation S50, in response to determining that the set operating parameters corresponding to the operating mode are related to a position of the air conditioner, obtaining the second position information stored in the air conditioner, and sending the second position information to the terminal; wherein after receiving the second position information, the terminal obtains the first position information via the positioning module positioning the air conditioner, and sends the first position information to the air conditioner in response to that the first position information does not match the second position information;

operation S30 further includes: operation S31, updating the set operating parameters of the operating mode according to the first position information.

In the embodiment, the operating parameters of some operating modes of the air conditioner are related to the position of the air conditioner, while the set operating parameters of some operating modes are not related to the position of the air conditioner. If the air conditioner can operate in an operating mode that is not related to the position, the air conditioner can operate in an operating mode with universal operating parameters. If the air conditioner operates in an operating mode that is related to the position, it is needed to determine whether the current position of the air conditioner is accurate. If inaccurate, it is needed to obtain an accurate position for updating the set operating parameters in the operating mode.

In this regard, after the air conditioner starts to operate, the operating mode of the air conditioner is first determined, and then whether the set operating parameters of the current operating mode are related to the position is determined. If the operating mode is a preset operating mode, it is determined that the set operating parameters of the current operating mode of the air conditioner are related to the position of the air conditioner. The air conditioner sets the operating mode in which the set operating parameter is related to the position to the preset operating mode. The air conditioner obtains the stored second position information and then sends the second position information to the terminal. In addition, the air conditioner can generate a query request and send the query request to the terminal along with the second position information. After receiving the second position information and the query request, the terminal uses the positioning module to position the air conditioner according to the query request to obtain the first position information, and then determines whether the first position information matches the second position information, and if not match, the terminal sends the first position information to the air conditioner. When the area corresponding to the first position information is not the same as the area corresponding to the second position information, it can be determined that the first position information does not match the second position information.

After receiving the first position information, the air conditioner updates the stored second position information to the first position information, and updates the set operating parameters of the current operating mode according to the first position information.

In the technical solution provided in the embodiment, when the set operating parameters corresponding to the current operating mode of the air conditioner are related to the position, the air conditioner needs to correct the current position, so that the operation of the current operating mode meets the user's needs.

Figure 5:
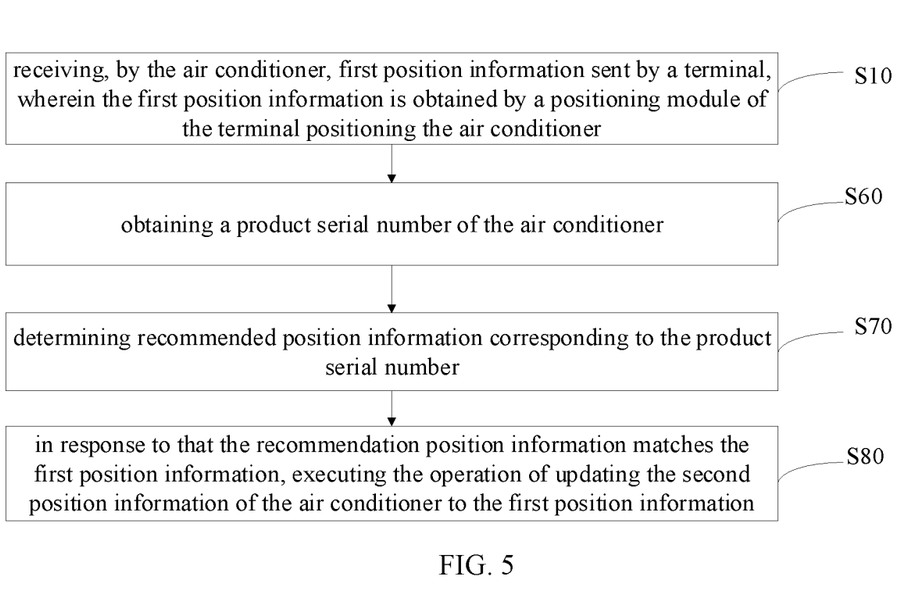
FIG. 5 is a flowchart of the method for controlling the air conditioner according to a fourth embodiment of the present application.

Referring to FIG. 5, FIG. 5 is a method for controlling the air conditioner according to the fourth embodiment of the present application, based on the second or third embodiment, after the operation S10, the method further includes:

operation S60, obtaining a product serial number of the air conditioner;

operation S70, determining recommended position information corresponding to the product serial number; and operation S80, in response to that the recommendation position information matches the first position information, executing the operation of updating the second position information of the air conditioner to the first position information.

In the embodiment, the air conditioner stores a product serial code, that is, the air conditioner stores an sn code. The sn code indicates a model of the air conditioner, and the model of the air conditioner differs for different geographical areas, that is, the manufacturer sets the corresponding air conditioners for the users in different territories in order to make the air conditioner meet the needs of the users in different territories, and the air conditioners corresponding to different territories are characterized by the sn codes.

The air conditioner stores the sn code and the recommended position information corresponding to the sn code, and the recommended position information is the area where the air conditioner is recommended to be used. The recommended position information includes a specific area, for example, the recommended position information may be Central China.

The positioning by the terminal of the air conditioner may be not accurate, or may be accurate, but the actual position of the air conditioner is not in the recommended area. Both can make the territory in the first position information to be not the territory in the recommended position information. After receiving the first position information, the air conditioner obtains the sn code of the air conditioner, to obtain the recommended position information according to the sn code, and then determines whether the recommended position information matches the first position information. If the geographic position in the first position information is located in the recommended area in the recommended position information, it is determined that the recommended position information matches the first position information, and the air conditioner then changes the position information to the first position information. If the recommended position information does not match the first position information, the first position information is discarded.

In the technical solution provided in the embodiment, the air conditioner obtains the product serial number of the air conditioner after obtaining the first position information, and obtains the recommended position information according to the product serial number, and updates the position information of the air conditioner to the first position information when the recommended position information matches the first position information to accurately update the position of the air conditioner.

The present application further provides an air conditioner, the air conditioner includes a memory, a processor, and a control program that is stored in the memory and operable on the processor, the control program when executed by the processor implements the method for controlling the air conditioner according to the above embodiment.

The present application further provides a computer readable storage medium, the computer readable storage medium stores a control program, the control program when executed by the processor implements the method for controlling the air conditioner as described above.

The foregoing serial numbers of the embodiments of the present application are for descriptive purposes only and do not represent the advantages or disadvantages of the embodiments.

It is noted that in this document, the terms "including," "comprising," or any other variation thereof are intended to cover non-exclusive inclusion such that a process, a method, an article, or an apparatus including a set of elements includes not only those elements, but also other elements not expressly listed, or which are inherent to such process, method, article, or device. Without further limitation, an element defined by the statement "including a" does not preclude the existence of another identical element in the process, the method, the article, or the apparatus that includes that element.

From the above description of the embodiment, it is clear to those skilled in the art that the method of the above embodiment can be implemented by means of software plus the necessary common hardware platform, or of course by means of hardware, but in many cases the former is the better way of implementation. Based on this understanding, the technical solution of the present application, in essence, or the part that contributes to the prior art, may be embodied in the form of a software product, which is stored in a storage medium (e.g., a ROM/RAM, a disk, a CD-ROM) as described above, including a number of instructions to enable a terminal device (which may be a mobile phone, a computer, a server, an air conditioning device, or a network device, etc.) to perform the method described in various embodiments of the present application.

The above is only an embodiment of the present application and is not intended to limit the scope of the present application. Any equivalent structure or equivalent process transformations by using the specification and the drawings of the present application, or any direct or indirect application in other related fields of technology, all fall within the scope of the present application.

What is claimed is:

1. A method for controlling an air conditioner comprising:
   obtaining second position information stored in the air conditioner, and sending the second position information to a terminal for the terminal to, after receiving the second position information, obtain first position information via a positioning module positioning the air conditioner, and send the first position information to the air conditioner in response to that the first position information does not match the second position information:
   receiving, by the air conditioner, the first position information sent by the terminal, the first position information including longitude and latitude of a location of the air conditioner;
   updating position information of the air conditioner from the second position information to the first position information; and
   updating a set operating parameter of an operating mode of the air conditioner according to the first position information, the set operating parameter being related to a position of the air conditioner.

2. The method according to claim 1, wherein the set operating parameter includes at least one of set cooling temperature, set heating temperature, set humidity, set cleanliness, set freshness, set air speed, or set sweeping direction of an air deflector.

3. The method according to the claim 1, wherein updating the set operating parameter includes:

in response to a difference between a first annual performance factor of the air conditioner corresponding to a first area and a second annual performance factor of the air conditioner corresponding to a second area being greater than a preset threshold, updating the set operating parameter of the air conditioner according to the first position information, the first area being determined according to the first position information, and the second area being determined according to the second position information.

4. The method according to claim 1, further comprising, after receiving the first position information:
obtaining a product serial number of the air conditioner; and
determining recommended position information corresponding to the product serial number;
wherein updating the position information of the air conditioner includes, in response to that the recommendation position information matches the first position information, updating the position information of the air conditioner from the second position information to the first position information.

5. The method according to claim 1, further comprising, after updating the position information of the air conditioner:
displaying prompt information of updating the position information from the second position information to the first position information.

6. The method according to claim 1, wherein receiving the first position information includes receiving the first position information through a near-field communication module.

7. An air conditioner comprising:
a memory storing a control program; and
a processor configured to execute the control program to:
obtain second position information stored in the air conditioner, and send the second position information to a terminal for the terminal to, after receiving the second position information, obtain first position information via a positioning module positioning the air conditioner, and send the first position information to the air conditioner in response to that the first position information does not match the second position information:
receive the first position information sent by the terminal, the first position information including longitude and latitude of a location of the air conditioner;
update position information of the air conditioner from the second position information to the first position information; and
update a set operating parameter of an operating mode of the air conditioner according to the first position information, the set operating parameter being related to a position of the air conditioner.

8. The air conditioner according to claim 1, wherein the set operating parameter includes at least one of set cooling temperature, set heating temperature, set humidity, set cleanliness, set freshness, set air speed, or set sweeping direction of an air deflector.

9. The air conditioner according to claim 7, wherein the processor is further configured to execute the control program to:
in response to a difference between a first annual performance factor of the air conditioner corresponding to a first area and a second annual performance factor of the air conditioner corresponding to a second area being greater than a preset threshold, update the position information of the air conditioner from the second position information to the first position information, the first area being determined according to the first position information, and the second area being determined according to the second position information.

10. The air conditioner according to claim 7, wherein the processor is further configured to execute the control program to, after receiving the first position information:
obtain a product serial number of the air conditioner;
determine recommended position information corresponding to the product serial number; and
in response to that the recommendation position information matches the first position information, update the position information of the air conditioner from the second position information to the first position information.

11. The air conditioner according to claim 7, wherein the processor is further configured to execute the control program to, after updating the position information of the air conditioner:
display prompt information of updating the position information from the second position information to the first position information.

12. The air conditioner according to claim 7, wherein the processor is further configured to execute the control program to receive the first position information through a near-field communication module.

13. A non-transitory computer readable storage medium storing a control program that, when executed by a processor of an air conditioner, cause the processor to perform the method according to claim 11.

14. The storage medium according to claim 13, wherein the processor is further configured to execute the control program to, after updating the position information of the air conditioner:
update a set operating parameter of the air conditioner according to the first position information.

15. The storage medium according to claim 14, wherein the set operating parameter includes at least one of set cooling temperature, set heating temperature, set humidity, set cleanliness, set freshness, set air speed, or set sweeping direction of an air deflector.

* * * * *